Nov. 28, 1967   P. A. LATHAM ET AL   3,355,063
NESTABLE BODIES FOR RIGID CONTAINERS
Filed Dec. 31, 1964   2 Sheets-Sheet 1

INVENTORS
Peter A. Latham
Paul E. Brefka
By
James F. Snowden
Attorney

INVENTORS
Peter A. Latham
Paul E. Brefka
By
*James F. Snowden*
Attorney

United States Patent Office 3,355,063
Patented Nov. 28, 1967

3,355,063
NESTABLE BODIES FOR RIGID CONTAINERS
Peter A. Latham, Stow, and Paul E. Brefka, Framingham, Mass., assignors, by mesne assignments, to Mobil Oil Corporation, a corporation of New York
Filed Dec. 31, 1964, Ser. No. 422,705
13 Claims. (Cl. 220—97)

ABSTRACT OF THE DISCLOSURE

A rectangular container for liquids having a unitary body with thin walls tapering toward the closed end; in forming a rigid container, an end piece is bonded to the open end of the body after filling the container. Horizontal corrugations extend across the full width of one pair of opposite side walls in areas adjacent to the open end to resist lateral deflection and deformation in an outward direction while the other pair of opposite side walls are flexible and bend inwardly under moderate pressure. This construction facilitates easy removal of the body unit from an integral female mold as well as the easy insertion and removal of the body unit from a nested stack of similar empty units by merely squeezing the flexible side walls inward to draw the corrugated side walls inwardly without substantial deformation of the latter.

---

This invention relates to a rigid, thin-walled plastic container and especially the nestable hollow body employed as a component thereof as well as the manufacture of the container body by the thermoforming technique.

Although plastic containers are produced in great volume for many applications, their use has nevertheless been restricted considerably by the cost and characteristics of plastic compositions. In the case of containers of substantial size which are intended to be thrown away after use with modestly priced products, such as milk or other foods, the container must have extremely thin walls in order to minimize the amount of plastic material discarded after a single use. For example, the average wall thickness of a high impact modified polystyrene container for milk should preferably not exceed about 30 mils (0.030 inch) if it is to compete successfully with containers made of other materials, such as paper and glass, at current prices.

While such thin sections of polymeric styrene have adequate physical strength for the purpose, many problems are encountered in endeavoring to produce a satisfactory container from this and other suitable thermoplastic compositions. Injection molding is not suitable for producing articles with thin enough walls. Blow molding is rather wasteful of material in producing articles with suitable pouring necks due to excessive variations in wall thickness in different parts of the article; moreover, such thickness variations are conducive to deviations in the loaded volume and result in an unacceptably high proportion of underfills and overfills for many purposes. Containers with flat walls of such thinness are usually not satisfactory, because the walls bulge considerably when the container is full and thus tend to jam the containers together in shipping cartons or boxes and also present an undesirable appearance. In addition, thin walls tend to collapse when the article is handled, and this is particularly objectionable when the closure has been removed as a portion of the contents may be ejected involuntarily by squeezing action in handling the container. Although it is common to reinforce sheet materials against flexing by corrugating them, the formation of such ribs or corrugations in containers creates additional problems. For example, vertical corrugations do not solve all of the problems and horizontally corrugated articles are difficult to remove from a mold and, more importantly, they are hard to nest and to disengage from nesting engagement with other articles of the same type. With thin-walled container bodies, especially when they are in relatively weak condition as a result of the open end required for nesting, the amount of force which may be employed in stacking and releasing the container bodies from nesting is quite limited. Also in molding, the release of such corrugated articles from a mold customarily involves opening or separating the mold into two or more sections, thereby requiring more complex and expensive molding equipment for closing and opening molds in proper sequence.

The present invention concerns a nestable article which comprises a thin-walled hollow body open at one end and constructed of thermoplastic material capable of substantial flexing in thin sections without cracking, at least two substantially opposite side wall panels or sections of said body being laterally flexible over substantial areas of said panels adjacent to said open end, at least two relatively rigid side wall panels each substantially oppositely disposed in the wall surface between said flexible panels and having a plurality of separate unbroken ribs or ridges substantially parallel to the plane of said open end to resist inward and outward flexing of said rigid panels, said ribs or corrugations extending substantially across said rigid panels in areas adjacent to said open end, the height of said ribs being substantially reduced adjacent the ends of said ribs, and at least two of said rigid panels and at least two of said flexible panels converging away from said open end although not necessarily toward the same point to thereby diminish the cross section of said body, whereby said body is readily releasable from nesting engagement inside articles of similar configuration upon bending or flexing said flexible panels inwardly to displace adjacent areas of said rigid panels inwardly without substantial outward bulging of the rigid panels. In a preferred embodiment, it is particularly concerned with container bodies of generally rectangular cross section, including those with rounded corners or with sides which are flat or somewhat curved, such as partial surfaces of cylinders of broad radius, and especially with bodies of approximately square cross section.

The invention also includes substantially rigid containers made from the aforesaid container bodies and the molding process of thermoforming such bodies in a female mold of complementary characteristics and releasing the molded articles therefrom without separating mold sections.

Other aspects of the invention are concerned with the proportions of flexible and rigid areas in the walls of the article, the amount of tapering or convergence of the walls of the article and the character of the bottoms of the grooves or spaces between the ribs.

Although the detailed description which follows is concerned chiefly with the preferred embodiment of a container body having a substantially rectangular cross section in the horizontal plane, since this form utilizes space most economically and is preferred for many commercial purposes, and also for illustrative purposes because the problems of stacking and releasing such hollow rectangular bodies from nesting engagement are usually more difficult; nevertheless, the present invention is also applicable to articles having other cross-sectional shapes, as exemplified by circles, ellipses or ovals, ovals with flat sides, and polygons having more than four sides, such as hexagons and octagons. An important consideration is that in areas near the open end of the article there must be at least two inwardly flexible side panels or areas facing one another with at least two relatively rigid or inflexible side panels or wall sections opposite to one another and disposed along the wall surface between the flexible panels. These flexible and rigid characteristics refer to bending or flexing of the walls or resistance thereto in transverse or horizontal planes under moderate pressure. With this construction, the rigid panels move inward without substantial flexing when the flexible panels are subjected to substantial and controlled inward flexing.

The matter of nesting container bodies is of considerable importance in commercial operations because plastic containers are usually molded in one location and shipped to a manufacturer or processor elsewhere who fills them with his product and seals them. If it is not possible to nest the bodies by telescoping or sliding them inside one another, inventory problems arise from the excessive amount of storage space required, and a great deal of shipping space is wasted with an attendant increase in shipping costs.

For a better understanding of the nature and objects of this invention, reference should be had to the accompanying drawings in which certain features are exaggerated somewhat for better illustration.

Figure 1:
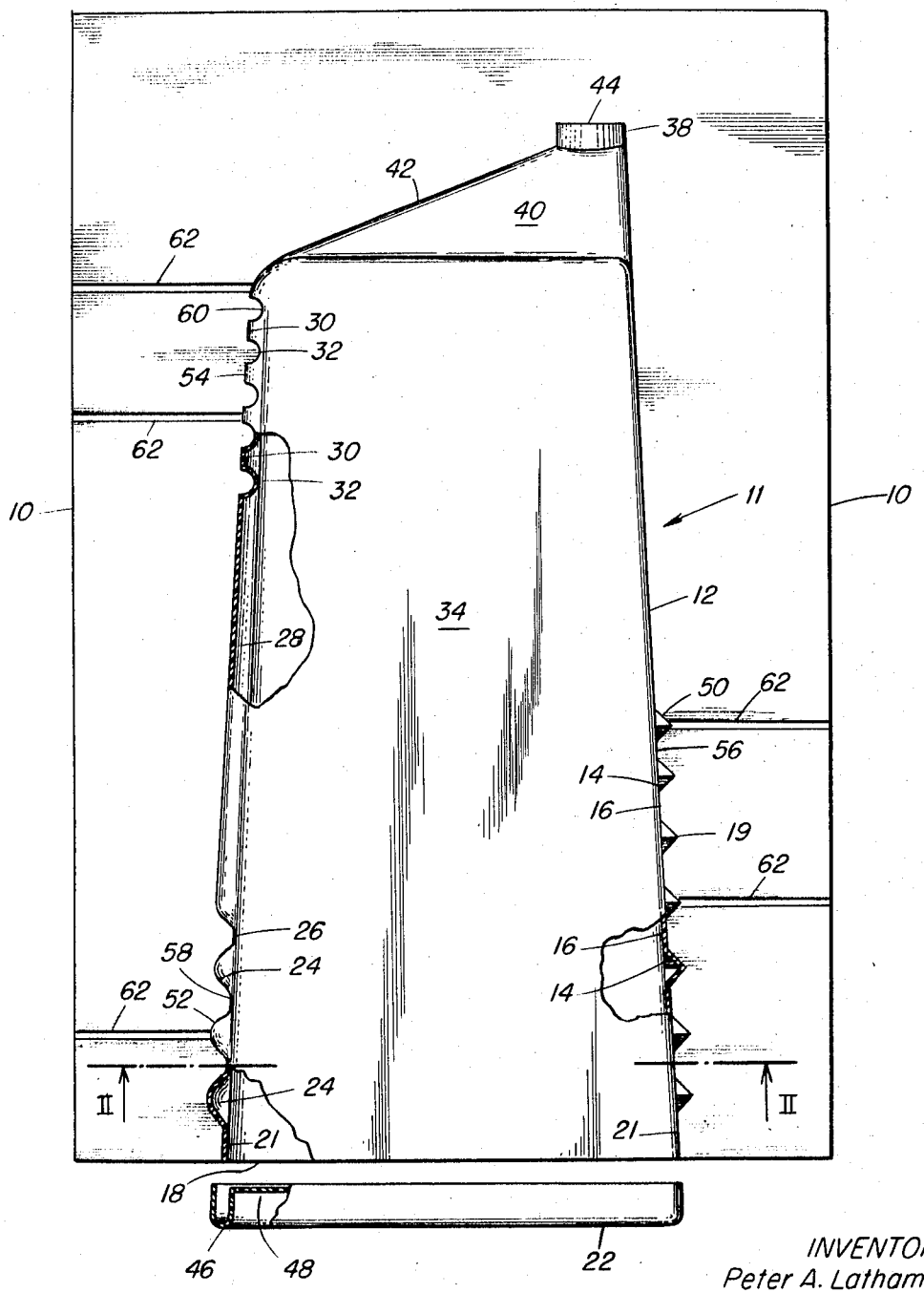
FIG. 1 is a side elevation, partly in section, depicting one embodiment of a container body of this invention resting in half of a female mold together with a suitable end closure for the body.
Figure 2:
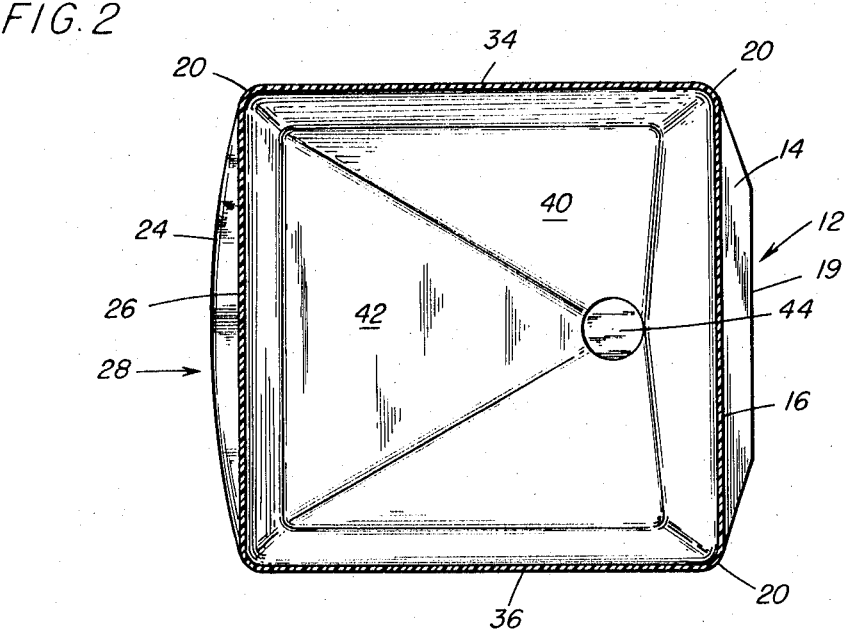
FIG. 2 is a horizontal section of the article only taken on the line II—II of FIG. 1 in the upward direction.

Turning now to FIG. 1, a half section 10 of a female mold split along the plane of the drawing is shown holding a tapered, hollow container body 11 of substantially square cross section with rounded corners as illustrated in FIG. 2. The body is preferably made of a high impact modified polystyrene as exemplified by the product of co-polymerizing 87 parts by weight of styrene with 13 parts of a rubbery polymer, such as polybutadiene. The average wall thickness of body 11 may be in the range of about 15 to 20 mils, but the actual thickness of different sections the walls often varies from about half to double the average wall thickness. Such variations result from the draft of the article, its shape and the molding conditions employed in forming it.

Although a more uniform configuration is often preferable, several different types of suitable reinforcing or stiffening structures are shown in FIG. 1 for purposes of fuller illustration. The generally flat front wall 12 of the container body has a plurality of raised, unbroken, angular ridges or ribs 14 extending across almost the full width of the wall in a horizontal direction and the ribs are separated by the horizontally elongated flat sections or grooves 16 which have straight or rectilinear bottoms. These ribs serve to rigidify or minimize any tendency toward transverse flexing of the lower area or panel of the front wall 12 adjacent to the open end 18 of the container body and thus minimize distortion of the lower front wall when it is displaced inwardly in order to facilitate its disengagement from a nesting relation. This stiffening also greatly reduces unsightly bulging of the thin lower section of the front wall of a complete and full container under the hydrostatic pressure of its liquid contents. The edge or top 19 of each rib 14 is straight for most of its length but slants in at each end toward the corners 20 of the container body thereby reducing the height of the ribs in those locations. A flat narrow border 21 is provided below the bottom rib for sealing engagement with the end closure 22 after the container has been filled.

A group of ribs 24 separated by grooves 26 in the lower section of back wall 28 of the container body provides similar reinforcement in that location. These undulating ribs and grooves appear as arcs of circles in a vertical cross section in a plane normal to the surface of wall 28 and this wall itself is in the form of an arcuate section of a cylinder. The grooves 26 are horizontal, partial cylindrical surfaces with straight or rectilinear bottoms, and the tops of the ribs 24 are horizontal arcs with the ends tangent to the rounded corners 20 as is apparent in FIG. 2. Thus, the height of these rounded ribs decreases from a maximum in the middle of wall 28 until the ribs disappear as they approach the corners of the container body.

The middle section of the wall 28 may be free of such reinforcing ribs but another group of less prominent ribs 30 separated by the rounded grooves 32 is desirably located on the upper rear wall in order to prevent the container from collapsing in that region under the squeezing action of a hand in gripping the upper rear portions of the sides 34 and 36 in normal fashion for lifting the container and for pouring from the pouring spout or neck 38 at the top of the container. Ribs 30 are located in an area which is more difficult to disengage from a stack of nested container bodies or from a mold; hence, ribs of less height than that of the lower group of ribs are desirable in this upper location, especially since the ribs 30 are subjected to less inward displacement than ribs 14 and 24 when the side walls are bent inwardly as described later. The tops of ribs 30 are relatively broad, and like the tops of ribs 24, they conform substantially to the arcuate shape of back wall 28; consequently the height of each rib 30 diminishes from a maximum in the middle of its length to nothing near the corners 20. Grooves 32 resemble grooves 26 in being partially cylindrical surfaces with straight bottoms in the horizontal or transverse direction.

Most, and preferably all, of the ribs in each group are uninterrupted or unbroken along their lengths in order to avoid establishing points of transverse flexure that tend to reduce the reinforcing or rigidifying effect of the corrugated panels.

Upon reference to FIG. 2, it is apparent that the various horizontal ribs fade off or curve toward the corners and terminate at or a short distance from the actual rounded corners 36. This construction tends to minimize interlocking of nested containers and renders them easier to separate, for the corners also are locations which are usually difficult to disengage in a stacked assembly. It will also be noted that the grooves 16, 26 and 32 all have straight bottoms along their entire lengths, and this feature reduces tooling costs as it facilitates making a relatively complex female mold in two sections.

The side wall 34 is flat and devoid of any reinforcement (e.g., a flange at the bottom edge) which will tend to interfere substantially with the flexing of wall 34 inward, and the same is true of the opposite side wall 36.

All of the lateral walls of the container body preferably slope inwardly at the same angle from the vertical thereby forming a tapered article with a transverse cross section which diminishes gradually toward the closed end of the container. Top panels 42 and 44 slope upwardly to join the cylindrical neck or spout 38. The closed top 44 of this neck may be sliced off or punctured with a disc cutter to provide an opening for a cork, hollow plastic plug or other convenient removable closure (not shown).

One embodiment of a suitable end closure for the open end 18 of the container body is shown in FIG. 1 and it may serve as either the top or the base of the finished container. Closure 22 is square in horizontal cross section with rounded corners and of a size corresponding with the open end 18 of the container body 11; and it may be formed by injection molding, thermoforming or various other shaping techniques. It has a double walled edge 46 and a recessed central panel 48 which may have solid ridges or hollow ribs (not shown) therein to provide a strengthening and stiffening effect for resisting downward deflection when the container is full. The turned down and doubled edge 46 strengthens this end closure considerably and enhances its rigidity besides providing a slot in which the edge borders 21 of the container body 11 may be sealed. The central recess 48 permits both sides of the double walled edge 46 to be engaged on both the exterior and interior by heat sealing equipment after the container body 11 is inverted from the position shown in FIG. 1 and filled to a suitable level with the desired contents in either fluid or solid form. When the end closure is welded or sealed in place on the body 11, it strengthens and stiffens that end of the container greatly against deflection or distortion, and the result is a unitary or integral container of surprising rigidity considering the thinness and flexibility of the thermoplastic material utilized. The closure 22 may have a wall thickness in the range of about 10 to 20 mils for the purpose of minimizing material cost and the weight of the container.

Figure 3:
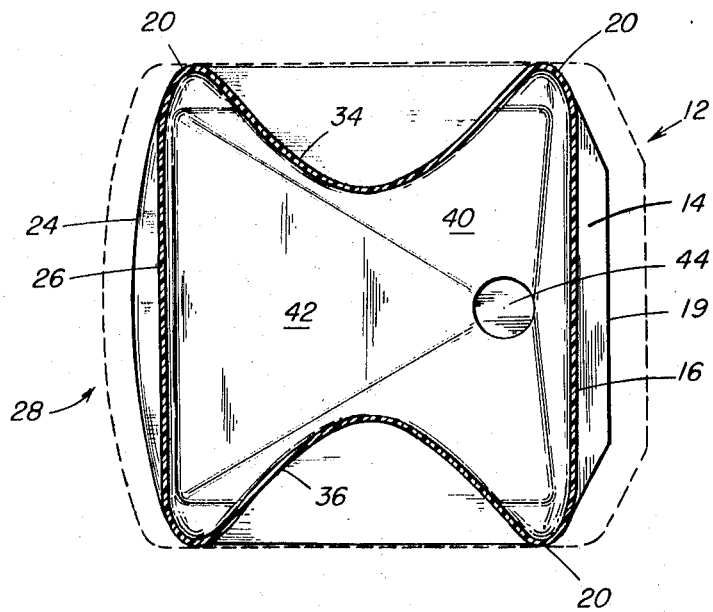
FIG. 3 is a similar horizontal sectional view taken on the same line II—II of FIG. 1 showing the container body only with the flexible sides thereof bent inwardly under pressure for removal of the container body from nesting engagement with a stack of similar bodies.

A cross section of the container body 11 looking upwardly with the body in its normal or relaxed position appears in FIG. 2 while FIG. 3 is similar on the same plane when the flexible side walls 34 and 36 of the article are subjected to controlled bending or flexing toward the interior of the container body for releasing the container body from nested engagement. Such deflection of the side walls may be produced by gripping and squeezing the article by hand or with gripping components on automatic machinery. As the side walls curve inwardly and move toward one another, the rectilinear distance between the two corners 36 adjacent each side wall 34 and 36 decreases; hence, the front and back walls 12 and 28 concomitantly and simultaneously are brought closer together. This is apparent from the dotted outline in FIG. 3 which represents the normal horizontal perimeter of the relaxed container body of FIG. 2. In addition, it will be observed from FIG. 3 that unlike flat, unreinforced walls the front and back walls 12 and 28 are not significantly distorted or bulged outward for the contours of the tops of ribs 14 and 24 remain substantially the same and the rectilinear bottoms of grooves 16 and 26 are also held straight. Eliminating or minimizing distortion of the front and back walls is important, for outward bulging of the ribbed sections would tend to lock stacked container bodies together and render their disengagement difficult or impossible.

Although the container bodies of this invention may be made by other methods, the body structure particularly lends itself to production in an improved thermoforming process in which it is not necessary to open and close the female mold. Ordinarily, separable mold cavity sections would be required to permit the removal of an article, such as that illustrated in FIG. 1, wherein ribs 14, 24 and 30 of the article 11 are in close contact and interlocked with complementary grooves 50, 52 and 54 respectively of the mold section 10. In addition, the straight bottom grooves 16, 26 and 32 of the article are engaged by the complementary horizontally straight ribs 56, 58 and 60 of mold 10. The complete female mold, of course, corresponds in shape to the container body 11 in having a substantial draft and a rectangular cross section decreasing gradually as the cavity tapers toward a closed end matching the top of the container body. The entrance of the mold is an unrestricted opening of the same size as the exterior of the open end 18 of the container body in order to permit easy withdrawal of the molded article.

Although, a one-piece mold may be employed in producing the novel articles of this invention, a substantial reduction in tooling costs can usually be realized in making the mold in two or more sections 10. However, these sections may be bolted firmly together as mold separation is not required during the molding cycle; this simplifies the molding operation and reduces machine cost and maintenance by eliminating apparatus elements for opening and closing the mold in timed sequence.

In practicing the preferred molding technique, a high impact modified polystyrene of 85 mils gauge clamped in a suitable carrier (not shown) is heated in an oven to a temperature of about 350° F. to soften it sufficiently for shaping. Then the carrier with the softened plastic sheet is held firmly against the bottom of the mold around the entrance to the mold cavity by a ring while a plug of slightly smaller dimensions than the mold cavity is utilized to push the softened sheet material deep into the mold cavity in accomplishing the main draw operation by the plug assist method. After this drawing, vaccum is applied to the channels 62, of which only a few are shown in FIG. 1, to draw the stretched plastic material into intimate contact with all parts of the mold surface where it is rapidly hardened by contact with the unheated mold cavity. Channels 62 typically are narrow in cross section with a width of only a few mils to avoid mold marks on the article, and these channels usually lead to the bottoms of mold grooves and other places where there is any tendency of the sheet material to bridge across. As soon as the thin wall article has set in a matter of about 2 to 12 seconds depending on the thickness of the article walls and the rigidity necessary for its removal, the plug is withdrawn and the container body 11 is removed from the mold cavity by applying positive pressure against the exterior of the article by admitting compressed air through the channels 62 while its interior is at atmospheric pressure and by moving the sheet carrier away from the mold.

Turning again to the container body, the front and back walls therefrom may have ribs spaced along their entire lengths or only in selected areas as shown in FIG. 1. In general, to obtain the necessary rigidity in the wall panels areas adjacent the open end 18, the corrugations should begin as close to the base or open end as may be practicable while providing an edge border 21 of suitable width for sealing engagement with closure 22. This ribbed pattern extends up the wall for a distance which is determined largely by the rigidity requirements of the particular container. It usually amounts to a distance equal to at least about one-third of the length of the edge of said rigid wall at the open end 18. There should be enough ribs or corrugations in the aforesaid pattern to provide the desired rigidity; and this depends on a number of factors, including the size of the container, the strength and stiffness of the thermoplastic material, the thickness of the wall and the height of the ribs. The number of ribs necessary can be decreased by increasing the height of the ribs. Generally there are a total of three or more corrugations, for example at least two ribs and one groove.

The flexible side walls or panels 34 and 36 are not necessarily flat over the full extent of their surfaces. They may have a variety of contours or relief patterns molded therein for ornamental or utilitarian purposes provided with such configuration does not offer serious or substantial resistance to flexing inwardly in the areas adjacent to the open end 18 of the body. It is desirable that this freely flexible area should extend up the wall from the open end for a distance equal to at least one-half of the width of the flexible side measured at the open end 18, and it is preferable to have this area extend up a distance of at least one such width. Accordingly, the flexible sides may have recessed or depressed areas in the vicinity of the top or middle of such sides to facilitate obtaining a more secure grip on the container, or the bulging tendency of the flexible sides of a full container may be controlled somewhat by partial or full length, straight or curved ribs extending in a generally vertical direction. Also short, sectional or full width horizontal ribs may be molded into the flexible sides 34 and 36 as long as provision is made for points of flexure or bending therein, for example by the interruption of a full width horizontal rib with a hollow vertical rib to provide a flexure point where the ribs intersect. Usually, it is preferred to employ such contoured patterns in the upper part of the flexible side where flexibility is less important that in the lower areas adjacent to the open end 18. Some of the many ornamental designs possible with articles constructed according to the present invention are illustrated in our concurrently filed Design Patent Serial No. 83,248 entitled "Merchandising Container or the Like" which issued as Design Patent No. 204,502 and Serial No. 83,249 entitled "Merchandising Container or Similar Article" which issued as Design Patent No. 204,503.

The amount of degree of flexibility required in the flexible sides 34 and 36 depends upon a number of complex factors which include the taper of the body, the sharpness of its corners, and its configuration in general as well as the height and style of the ribs, the thickness of the sides and the strength of the thermoplastic material. In many instances, it is desirable for these walls to be sufficiently flexible to each bend inwardly at at least one point along each edge thereof at the open end for a distance equal to at least 20% of the length of said edge. A flexing capability of at least 40% on this basis is often preferred.

The term "panels" as used herein does not necessarily refer to depressed or raised wall configurations unless so specified, for the expression is also used to designate certain wall areas or sections which may be flat or curved and often free of relief patterns. The opposed flexible wall panels do not need to be exactly or diametrically opposite one another as in a preferred embodiment, provided that they are generally or substantially facing one another across the interior of the container body, and this is also true in respect to the opposed rigid walls. For example, an article of hexagonal cross section may be constructed according to the invention with three flexible walls disposed around the periphery in alternate fashion with three ribbed walls. In general, the flexible panels may occupy about 20 to 60% of the peripheral surface adjacent to the open end 18 and the rigid panels substantially occupy the remainder of said peripheral surface, and the optimum ratio of flexible to rigid areas (e.g. approximately 50:50 in a body of generally square cross section) is determined mainly by the configuration of the article and its ribs. While the opposed panels of each type are not necessarily of the same extent or area, it is often desirable to have similar and equal flexible wall areas in order that they may have substantially the same flexural characteristics.

A few of the many suitable types of reinforcing ribs and grooves are illustrated in the drawings. The ribs may be in the form of ridges raised above the general surface of a side wall or their tops may be flush with the surface of nearby areas of the side walls. While most and preferably all of these substantially horizontal ribs 14, etc. are unbroken over their entire lengths, they do not continue around any corner of the article. Instead their height measured from the bottoms of the grooves is substantially decreased in approaching the corners and it is preferable to have the ribs terminate or disappear at or just before reaching the corners of the article (e.g. as tangents to a corner radius) in order to minimize binding there during disengagement from stacking. However, these ribs should not terminate a substantial distance short of the corners, inasmuch as this might create flexure points or lines in the ribbed walls which could destroy their effectiveness.

In the case of a container body about 4 to 10 inches high, the reinforcing ribs may be about 0.03 to 0.25 inch high and preferably about 0.06 to 0.20 inch high for purposes of illustration, and this depends to a considerable extent on the dimensions of the open end of the body and especially the width of the flexible sides. Generally, the maximum height of the ribs amounts to less than about 15% of the width of a flexible side or panel and preferably less than about 4% thereof. However, it is usually desirable to have ribs at least 0.03 inch high for good resistance to flexing. The thickness of the base or maximum cross section of the ribs is desirably at least about double their height for purposes of easy disengagement. The grooves between the ribs may have similar proportions to provide desirable spacing of the ribs. As indicated earlier, grooves in which the bottoms form straight horizontal lines or planes across substantially the width of the side wall are preferable to other configurations. Rounded grooves and ribs having generally cylindrical surfaces appear to be superior in facilitating easy release of ribbed articles from a nested stack.

In order to be capable of nesting in like bodies and easily removable from a mold cavity, the container body must have at least some taper or diminution in cross section. That is, at least two substantially opposite rigid wall panels should converge toward a point in a direction away from the open end or base of the body and at least two substantially opposite flexible wall panels should also converge away from the open end toward either the same point or a different point, a common point of convergence frequently being preferred. Although often desirable, it is not essential for both wall panels in each such pair to slope inwardly toward the interior of the container body, for one wall panel may be vertical or perpendicular to the plane of said open end and the necessary convergence provided by sloping the other wall panel inward toward the vertical one. It is, of course, not necessary for the converging walls of a pair to actually meet.

Since the converging wall panels may be neither flat nor directly opposite one another, the angle of convergence between converging walls or panels may be defined for the purpose of this invention as the angle between two lines, which may be projected as necessary, each extending up the middle of a wall panel and substantially perpendicular to the edge of said wall panel at the open end of the body.

At least some of the problems of nesting engagement and disengagement may be solved by producing a hollow article of extremely tapering form, but extreme taper is undesirable in same articles by reason of wasting space, etc., thus such configuration is limited in its application. The present invention on the other hand is particularly useful with nestable articles of slight or moderate taper, as for instance, where the both of the aforesaid pairs of rigid and flexible walls or panels have angles of convergence within the range of about 0.4 to 12 degrees, and preferably about 1 to 6 degrees. The latter range corresponds to sloping each of two wall panels inwardly at an angle of 0.5 to 3 degrees from the vertical or of having one vertical wall panel with the other wall panel converging toward it at an angle of 1 to 6 degrees from the vertical. It is generally preferable to have each of a pair of flexible wall panels slope inwardly the same amount and also each of a pair of rigid wall panels slope inwardly the same amount which may differ from the slope of the flexible panels, as such bodies nest in a straight line rather than a curved stack and hence occupy less space.

The denesting qualities of container bodies constructed according to the present invention were strikingly demonstrated by applying the following test to stacks of identical articles. The bodies were each 9.6 inches high with an open base approximately 4 inches square having flexible side walls, 5/64 inch high horizontal ribs rounded at their ends disposed across the lower third of the front wall and the entire back wall, and convergence angles of 1.7 degrees for both pairs of opposite walls. Two stacks of bodies were closely nested to the same end clearance and then pulled apart by measured forces with and without bending the flexible side walls inwardly. It was found that a force of 18 pounds was required to separate bodies in the first stack when the side walls were not squeezed inward. However, bodies in the second stack could be readily separated by a force of less than 2 pounds when the edges of the flexible side walls were squeezed in until their centers were 1 inch apart for this squeezing action displaced each of the front and back walls about a half inch inward in areas adjacent their bottom edges.

A wide variety of plastic polymers may be used in molding the container body provided they have sufficient flexibility to be deflected or bent without cracking to the extent described herein. Such thermoplastic compositions have the usual additives therein as illustrated by coloring pigments or dyes, fillers or extenders, plasticizers, and various stabilizers to promote resistance to heat, ultraviolet light, etc. A few of the many suitable materials for at least some purposes include polyethylene, polypropylene, plasticized polyvinyl chloride and related vinyl polymers, nylon, polyallomers, formaldehyde polymers, acrylonitrile-butadiene-styrene resins, cellulose acetate, cellulose acetate-butyrate, ethyl cellulose and polymethylmethacrylate.

While the present invention has been disclosed in considerable specific detail for purposes of illustration, it will be readily apparent to those skilled in the art that many other embodiments fall within the purview of this invention. For instance, the hollow container body may have both ends open. Accordingly, this invention should not be construed as limited in any particulars except as may be recited in the appended claims or required by the prior art.

We claim:

1. A nestable article which comprises a thin-walled hollow body open at one end and constructed of thermoplastic material capable of substantial flexing in thin sections without cracking, at least two substantially opposite side wall panels of said body being laterally flexible over substantial areas of said panels adjacent to said open end, at least two relatively rigid side wall panels each substantially oppositely disposed in the wall surface between said flexibe panels and having a plurality of separate unbroken ribs substantially parallel to the plane of said open end to resist inward and outward flexing of said rigid panels, said ribs extending substantially across said rigid panels in areas adjacent to said open end, the height of said ribs being substantially reduced adjacent to the ends of said ribs, and at least two of said flexible panels and at least two of said rigid panels converging away from said open end to thereby diminish the cross section of said body, whereby said body is readily releasable from nesting engagement inside articles of similar configuration upon bending said flexible panels inwardly to displace adjacent areas of said rigid panels inwardly without bulging the rigid panels substantially outward.

2. An article according to claim 1 in which the angle of convergence between two of said rigid panels is within the range of about 0.4 to 12 degrees.

3. An article which comprises a container body according to claim 1 with an end closure sealed across said open end thereof to form a substantially rigid closed container.

4. An article according to claim 1 in which said flexible panels occupy between about 20 and 60 percent of the peripheral surface adjacent to said open end of said articles and said rigid panels substantially occupy the remainder of the peripheral surface adjacent to said open end.

5. A nestable article which comprises a thin-walled hollow body of flexible thermoplastic material open at one end and having a cross section in the form of a polygon with an even number of sides, at least two substantially opposite side walls of said body being provided with a plurality of separate unbroken reinforcing ribs substantially parallel to the plane of said open end and extending substantially across said walls in areas adjacent to said open end to minimize flexing of said walls in a plane substantially parallel to the plane of said open end, the height of said ribs being substantially reduced adjacent to the corners of said body, at least two other substantially opposite side walls free of elements reinforcing areas thereof adjacent said open end against inward deflection thereby permitting substantial flexing of said other walls under pressure toward the interior of said body and concomitant inward displacement of at least the areas of said ribbed walls adjacent to said open end without substantial distortion of said ribbed walls, and at least two of said ribbed walls and at least two of said flexible walls converging away from said open end to thereby diminish the cross section of said body, whereby said body is readily releasable from nesting engagement with similar hollow articles by bending said flexible walls inwardly.

6. An article according to claim 5 in which said flexible walls are sufficiently flexible to bend inwardly at a point along each edge thereof at said open end for a distance equal to at least 20% of the length of said edge.

7. An article according to claim 5 in which the angles of convergence between two of said ribbed walls and between two of said flexible walls are each within the range of about 0.4 to 12 degrees.

8. An article which comprises a container body according to claim 5 with an end closure sealed across said open end thereof to form a substantially rigid closed container.

9. A nestable article which comprises a thin-walled hollow container body of substantially rectangular cross section and open at one end, said body being constructed of thermoplastic material capable of substantial flexing in thin sections without cracking, two opposite flexible side walls of said body being capable of flexing inwardly over substantial areas of said walls adjacent to said open end, the other two opposite side walls of said body being provided with a plurality of separate unbroken ribs aligned substantially parallel to the plane of said open end and extending substantially across said other walls in areas adjacent to said open end to resist inward and outward flexing of said other walls in a plane substantially parallel to the plane of said open end, the height of said ribs being substantially reduced adjacent the corners of said body, and said flexible walls and said ribbed walls converging away from said open end of said body to gradually decrease the cross section thereof, whereby said container body is readily releasable from nesting engagement inside articles of similar configuration by bending said flexible walls inwardly to displace adjacent areas of said ribbed walls inwardly without bulging the ribbed walls substantially outward.

10. A nestable article which comprises a thin-walled hollow body for a rigid container of substantially rectangular horizontal cross section and of substantially equal vertical taper on all sides, said body being open at one end and constructed of thermoplastic material capable of substantial flexing in thin sections without cracking, two relatively rigid opposite walls of said body being provided with a plurality of separate unbroken substantially horizontal ribs extending substantially across said rigid walls in areas adjacent to said open end in order to resist flexing of said walls in a substantially horizontal plane, the tops of said ribs being curved in substantially horizontal planes toward the corners of said body, grooves between said ribs having rectilinear bottoms along the length thereof, two flexible opposite walls of said body being horizontally flexible in areas adjacent to said open end to provide for substantial deflection under pressure toward the interior of said body and for concomitant inward displacement of the ribbed walls of said body without substantial distortion of said ribbed walls, whereby said container body is readly releasable from nesting engagement with articles of similar configuration by bending said flexible walls inwardly in areas adjacent to said open end.

11. An article according to claim 10 in which said flexible walls are sufficiently flexible to bend inwardly at a point along each edge thereof at said open end for a distance equal to at least 40% of the length of said edge.

12. An article according to claim 10 in which the angle of convergence between said opposite walls is within the range of about 1 to 6 degrees.

13. An article according to claim 10 in which the horizontally flexible area of each of said flexible walls extends from said open end of said body for a distance equal to at least half of the length of the edge of said flexible wall at said open end.

References Cited
UNITED STATES PATENTS

| | | | |
|---|---|---|---|
| 2,973,558 | 3/1961 | Stratton | 264—92 X |
| 3,111,240 | 11/1963 | Whitton | 220—67 |
| 3,165,234 | 1/1965 | Conklin | 220—97 X |
| 3,172,927 | 3/1965 | Mojonnier | 264—92 |
| 3,176,879 | 4/1965 | Mojonnier | 220—4 X |

THERON E. CONDON, *Primary Examiner.*

GEORGE E. LOWRANCE, *Examiner.*